United States Patent

[11] 3,627,711

[72] Inventors Guenter Schroeder
  Ober Ramstadt;
  Wolfgang Gaenzler, Darmstadt; Willy
  Bitsch, Weiterstadt, Darmstadt, all of
  Germany
[21] Appl. No. 884,383
[22] Filed Dec. 11, 1969
[45] Patented Dec. 14, 1971
[73] Assignee Rohm & Haas G.m.b.H.
  Darmstadt, Germany
[32] Priority Dec. 27, 1968
[33] Germany
[31] P 18 17 156.7

[54] FOAMABLE SYNTHETIC RESIN COMPOSITIONS
  10 Claims, No Drawings
[52] U.S. Cl.................................................... 260/2.5 N,
  260/2.5 R, 260/80.3 R, 260/80.8, 260/80.3 N,
  260/85.5 R, 260/86.1 N

[51] Int. Cl......................................................... C08f 47/10,
  C08f 27/34, C08f 45/44
[50] Field of Search............................................260/2.5, 2.5
  N, 80.3 R, 85.5 R

[56] References Cited
UNITED STATES PATENTS 3,449,269 6/1969 Hyde............................ 260/2.5 N
3,489,700 1/1970 Kanai et al.................... 260/2.5

*Primary Examiner*—Murray Tillman
*Assistant Examiner*—Wilbert J. Briggs, Sr.
*Attorney*—Curtis, Morris & Safford ABSTRACT: Foamable synthetic resin compositions of (1) a polymer comprising at least 20 percent by weight of acrylic acid and/or methacrylic acid and (2) formamide or a monoalkyl formamide as a foaming agent. Methods of making such compositions. Moisture-resistant foams prepared by heating such foamable compositions at elevated temperatures.

FOAMABLE SYNTHETIC RESIN COMPOSITIONS

The present invention relates to foamable synthetic resin compositions, to foams produced therefrom, and to methods of making said foamable compositions and foams.

British Pat. Specification 994,725 describes foamed structures prepared from an acrylic resin comprising acrylic acid or methacrylic acid and/or their amides, together with a foaming agent. Among foams of this type, those prepared from resins having a considerable portion of their acrylic acid or acrylamide groups (or groups of the corresponding methacryl-monomers) converted to imide groups, and in which urea is used as the foaming agent, are particularly outstanding. This preferred group of foams is known from British Pat. Specification 1,045,229, for example. The foams of this group are distinguished from those prepared using itaconic acid, maleic acid anhydride, citric acid, trichloroacetic acid, dicyandiamide, or chloral hydrate as foaming agents by their characteristically higher resistance to heat and corrosion. They are, however, still relatively water-sensitive, that is they contract or shrivel up after long contact with water or under the influence of moist air.

It has now been found that very valuable foams can be prepared from acrylimide and/or methacrylimide resins using formamide or monoalkyl formamide as foaming agents. These foams are equal in their mechanical and thermal properties to those prepared using urea as the foaming agent, but are superior from the point of view of their resistance to water.

The present invention, thus, particularly relates to foamable compositions comprising: (a) a polymer comprising at least 20 percent by weight of acrylic acid and/or methacrylic acid and optionally one or more further unsaturated monomers; and (b) formamide or a monoalkyl formamide having up to three carbon atoms in the alkyl group. One can make use of a number of different reactions occurring in the macromolecule to introduce acrylimide and/or methacrylimide groups into the foams prepared from the foamable compositions of the present invention. The most important of these are shown below (wherein R is hydrogen or methyl):

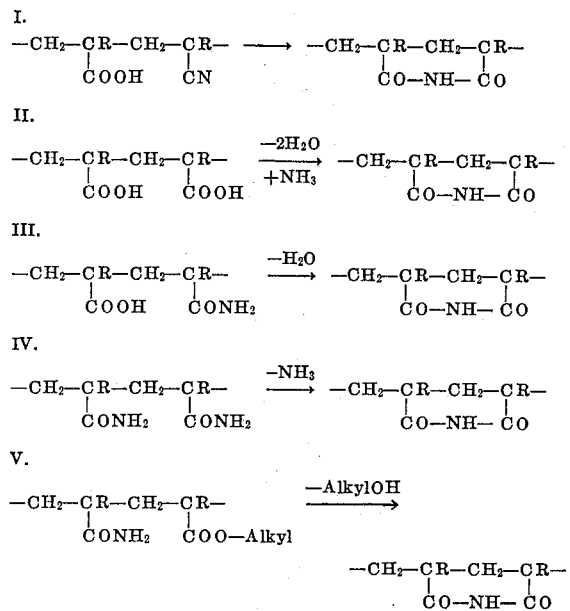

In principle, cyclic imide groups can also be formed by the polymerization of monomers of the formula $CH_2=CR-CO-NH-CO-CR=CH_2$. However, these monomers are used only in minor amounts, e.g. up to 2 percent by weight, for the preparation of foamable plastics since if employed in larger amounts they would lead to the formation of cross-linked nonfoamable polymers.

The more imide groups present in the polymer structure, the more advantageous the properties of the foam. The monomers taking part in reactions I–V, that is acrylic acid, methacrylic acid, and the amides, nitriles, or lower ($C_1$–$C_3$) esters thereof, thus preferably comprise the major portion of the foamable resin. The ammonia necessary for reaction II can stem in part from reaction IV and in part from reactions of formamide. If N-alkyl formamides are used as foaming agents, the corresponding alkyl amines are produced in reaction IV in place of ammonia. Foams predominantly comprising methacrylimide units are far superior in their useful properties to those predominantly comprising acrylimide units, so that resins comprising methacryl compounds are employed to particular advantage. The combination of methacrylic acid and methacrylonitrile gives the most advantageous properties.

In order to insure a complete conversion of all carboxy groups into imide groups according to reactions, I, II, and III, formamide or monoalkyl formamide should be employed in amounts such that the total amount of nitrogen present in the form of amide or nitrile groups of the polymer and in the form of formamide or alkylated formamide is at least one-half the molequivalent of the acryl monomer units of the polymer which are convertible into imide groups according to reactions I–V. Formamide or monoalkyl formamide should, however, be present at least in such amounts that the decomposition gases are sufficient for foaming of the resin, i.e. at least 1 to 2 percent by weight of the resin, preferably about 5 to 10 percent by weight, and up to 20 percent or more by weight for the preparation of extremely light foams. Monoalkyl formamides should be used in somewhat greater amounts than unsubstituted formamides, e.g. about one-third more in the case of monomethyl formamide and about twice the amount in the case of propyl formamide.

In addition to the monomer units taking part in reactions I–V, the foamable resin may comprise one or more further unsaturated polymerizable compounds. However, only monomers without reactive functional groups should be employed in large amounts, that is in amounts of up to 30 percent by weight. Styrene and its homologs, acrylic and methacrylic acid esters with more than three carbon atoms in the alcohol portion, vinyl esters, and vinyl halides are examples of such monomers. However, since these monomers decrease the heat resistance of the foam and increase its sensitivity to organic solvents, they are preferably incorporated in only very small amounts into the resins.

In contrast, further improvements in properties can be achieved by the inclusion in the resin molecule of small amounts, e.g. up to 10 percent by weight, of compounds having at least two reactive groups. Such reactive groups include vinyl, vinylidene, amide-methylol, capped amide-methylol, carbamide-methylol, carbamide-methylol ether, azlactone, and epoxy groups. Of these compounds, those having two or more vinyl or vinylidene groups in the molecule lead directly to cross linking during polymerization. Compounds with only one vinyl or vinylidene group and at least one other of the aforementioned groups are incorporated by polymerization but only contain cross linkable groups of the type last mentioned. The hardness of the foam as well as its resistance to corrosive agents is increased by cross linking. Further unsaturated polymerizable compounds such as maleic acid anhydride, vinyl pyrrolidone, and hydroxy alkyl esters or dialkyl amino alkyl esters of unsaturated carboxylic acids can be incorporated in limited amounts, e.g. up to 15 percent by weight, into the resin in measure with the desired foam properties.

The new foamable resins can be prepared by bulk or bead polymerization. When they are to be foamed directly, for example in the form of sheets, formamide or an alkyl formamide is initially included in the polymerization batch. Polymerization takes place under the influence of free-radical-forming polymerization initiators such as benzoyl peroxide, dilauryl peroxide, or azo bis isobutyronitrile, or in the presence of redox initiator systems at temperatures of from 20° C.–100°C.

Film bags, for example of cellulose, polyethylene terephthalate, or combinations thereof can be employed as polymerization vessels, as can flat chambers formed from two glass or metal plates optionally provided with a release coating, e.g. of polytetrafluoroethylene or of silicones, and having a sealing gasket.

The polymers are clear and homogeneous. After conclusion of the polymerization, they are heated for a few hours at 100° C.–120°C.

In contrast, if foamed bodies of complicated shape are to be prepared, a granulate of the foamable resin is suitably first prepared. This can be obtained by grinding a bulk polymer of the type described above. It is also possible, however, to first prepare the resin free of formamide, proceeding essentially as described above, to grind the resin, and then to charge the ground material with a formamide. For this purpose, the formamide is suitably employed in vapor form or as a solution in a material, such as petroleum ether, which is a nonsolvent for the polymer. In the absence of a formamide, polymerization often takes place nonuniformly and leads to cloudy, inhomogeneous polymers which tend to foam unevenly. This deficiency is met by the addition to the monomer mixture of silica aerogel, asbestos flour, or of soluble polymers comprising acrylic ester, vinyl ester, vinyl ether, or vinyl acetal units, for example polyethyl acrylate or polyvinyl butyral.

In principle, a bead polymerization process can also be employed for the preparation of the foamable plastics. In this case, formation of large beads should be sought, which is promoted for example by the addition of the distribution agent 1 to 2 hours after onset of the polymerization. The formamides used as foaming agents are more or less water soluble and therefore distribute themselves in solution equilibrium between the monomer phase and the water phase. This must be taken into account in calculating the amount of foaming agent to be employed. Also, in this case the polymer is preferably first prepared without the addition of a formamide, optionally in the presence of a small amount of urea, then separated from the water phase and treated with the formamide. Otherwise, the usual techniques and process conditions of bead polymerization are employed, including also the use of conventional inorganic distribution agents or of protective colloids such as polyvinyl alcohol, polyvinyl pyrrolidone, or copolymers of acrylic acid.

When the polymers prepared according to the present invention are heated to 170° C.–300°C., the formamides decompose to form gaseous products which effect foam formation. Simultaneously, the resin is imidized, that is cyclic acrylimide or methacrylimide units are formed. Hot gases, for examples a gas circulating hating oven, are most suitable as a heating medium. Resins in sheet form are suitably foamed between sheet metal or metal plates to assure an even surface. Foamable granules are foamed in molds having a cavity in the form of the foamed body to be prepared. It has proved particularly useful not to foam the granulated or bead polymer directly in the mold, but to prefoam it outside of the mold in an open container and then finally to foam the prefoamed material in a mold in a second foaming step. In prefoaming, the finely divided resin is heated to a temperature of 150° C.–200°C. until its bulk density is about one to three times the desired foam density. If this heat treatment takes place in an open container in which the resin particles can expand without resistance, they do not fuse to each other. The prefoamed material is then placed in a hollow mold and finally foamed at temperatures of 180° C.–300° C. If necessary, the prefoamed material can be stored for any desired period of time prior to final foaming. In this final foaming, it is of advantage, particularly for the preparation of pieces of a complicated shape, if the prefoamed material has a bulk density near that of the desired foam density, since then the mold can be completely filled. On heating in the mold, the interstices between the separate foamed particles are filled and the particles fuse tightly to one another. A prior treatment of the prefoamed material with water vapor or formamide vapors facilitates fusing of the particles.

Foams having densities of about 30–300 g./liter can be prepared from foamable resins in either sheet for or in granulated form. The density which can be obtained and the pressure exerted by the foaming material against the mold walls are both dependent on the amount of foaming agent employed.

The foamed bodies produced from resins prepared according to the present invention are resistant to cold and hot water. Their resistance to heat, particularly if their composition permits the formation of pure polymethacrylimide, reaches values of 200° C.–250°C. In contact with atmospheric oxygen, the foams withstand storage at a temperature of 150° C. They can be stored at 180° C. if atmospheric oxygen is excluded.

The preparation of foamable resins according to the invention and their conversion into foams is described in the following examples. The behavior of these foams when contacted with boiling water is compared to that of foams prepared with urea as the foaming agent.

EXAMPLES 1–4

Mixtures of methacrylonitrile, methacrylic acid, and formamide in the amounts given in table I were combined with 0.1 part by weight of tertiary-butyl perpivalate and 0.05 part by weight of benzoyl peroxide, polymerized between glass plates separated by a flexible rope gasket under the conditions given in table I, and then tampered by heating for three hours at 100° C.

TABLE I

| Example No. | Parts by weight of— | | | Polymerization | |
|---|---|---|---|---|---|
| | Methacrylonitrile | Methacrylic acid | Formamide | Hours | ° C. |
| 1 | 55 | 45 | 3 | 20 | 48 |
| 2 | 40 | 60 | 2.3 | 22 | 48 |
| 3 | 30 | 70 | 8.2 | 19 | 45 |
| 4 | 10 | 90 | 20.3 | 16 | 45 |

The clear yellowish-to-brownish polymer sheets having a thickness of 9 mm. were heated for 30 minutes at 200° C.–210°C. to form foams of the densities given in table II.

TABLE II

| Example | 30 Minutes Foaming (°C.) | Density (kg./m.³) | Appearance of the Foam |
|---|---|---|---|
| 1 | 210 | 75 | Yellow, fine-pored |
| 2 | 210 | 56 | Yellowish, fine-pored |
| 3 | 200 | 40 | White, fine-pored |
| 4 | 200 | 15–20 | White, coarse-pored |

EXAMPLES 5–6

Mixtures comprising 30 parts by weight of methacrylonitrile, 70 parts by weight of methacrylic acid, 8.2 parts by weight of formamide and methylmethacrylate or styrene were made into a polymer sheet by adding 0.1 part by weight of tertiary butyl perpivalate and 0.05 part by weight of benzoyl peroxide and them warming for 20 hours at 48° C. and tempering for three hours at 100° C. These polymers were converted by heating at 210° C. to fine-pored white foams of low density (cf. table III).

TABLE III

| Example | Comonomer | Parts by weight | Minutes of foaming at 200° C. | Density (kg./m.³) |
|---|---|---|---|---|
| 5 | Methylmethacrylate | 10 | 60 | 20 |
| 6 | Styrene | 5 | 30 | 50 |

EXAMPLE 7

30 parts by weight of acrylonitrile, 70 parts of methacrylic acid, and 10 parts of formamide were warmed with 0.1 part of tertiary butyl perpivalate and 0.05 part by weight of benzoyl peroxide for 18 hours at 42° C. in a glass chamber and then heated further for three hours at 100° C. In this manner a brownish clear polymer sheet was prepared which was foamed to a light-colored foam having a density of 48 kg./m.³ by heating at 200° C. for 30 minutes.

EXAMPLE 8

30 parts by weight of acrylamide, 10 parts by weight of formamide, 0.05 part by weight of tertiary butyl perpivalate, and 0.05 part by weight of benzoyl peroxide were dissolved in 70 parts by weight of methacrylic acid. This solution was polymerized to a clear colorless polymer sheet between glass plates separated by a flexible thread gasket by heating for 40 hours at 40° C. and for three hours at 100° C.

By heating this material to 210° C., it was converted to a white foam of low density.

EXAMPLE 9

A mixture comprising 70 parts by weight of acrylic acid 30 parts of methacrylonitrile, 10 parts of formamide, 0.01 part of tertiary butyl perpivalate, and 0.05 part by weight of benzoyl peroxide was heated in a glass chamber for 96 hours at 40° C. and subsequently for 3 hours at 100° C. A clear yellow polymer resulted which formed a white foam having a density of 35 kg./m.³ on heating for 1 hour at 200° C.

EXAMPLES 10-11

Mixtures of methacrylonitrile, methacrylic acid, and formamide, as reported in Table IV, after the addition of 0.1 part by weight of tertiary butyl perpivalate and 0.05 part by weight of benzoyl peroxide, were polymerized in polyester foil bags to form clear polymer slabs by heating for 20 hours at 48° C. and subsequently tempering for three hours at 100° C.

TABLE IV

| Example | Parts by weight of— | | |
|---|---|---|---|
| | Methacrylonitrile | Methacrylic acid | Formamide |
| 10 | 30 | 70 | 8.2 |
| 11 | 20 | 80 | 14.4 |

These slabs were granulated, sieved according to particle size, and those fractions having a particle size between 2 and 5 millimeters were prefoamed by heating in a loose heap (cf. table V below). A pressure resistant form was fully filled with this prefoamed granulate and heated for 30 minutes at 250° C., whereby fully foamed shaped bodies were obtained. The foam properties are also reported in table V.

TABLE V

| Example | Prefoaming (Minutes) | (°C.) | Bulk Density (kg./m.³) | Foam Density (kg./m.³) |
|---|---|---|---|---|
| 10 | 30 | 190 | 74 | 70 |
| 11 | 20 | 190 | 48 | 45 |

EXAMPLE 12

A mixture of 20 parts by weight of methacrylonitrile, 80 parts of methacrylic acid, 14.5 parts of monomethylformamide, 1.5 parts of formic acid, 0.1 part of tertiary butyl perpivalate and 0.05 part of benzoyl peroxide was converted to a clear colorless polymer sheet by heating between glass plates for 20 hours at 48° C. and tempering for 3 hours at 100° C. The polymer plate forms a white foam on heating at 200° C.

EXAMPLE 13

A polymerizable mixture of 40 parts by weight of methacrylonitrile, 60 parts of methacrylic acid, 10 parts of formamide, 0.4 part of azo isobutyronitrile and 0.5 part of dilauroyl peroxide was introduced at 75° C., with stirring, into a solution of 5 parts by weight of urea in 250 parts by weight of water which additionally contained 2 parts by weight of polyacrylic acid as a protective colloid. After 18 hours the material was cooled and the resulting bead polymer was separated and dried.

Beads having a diameter from 0.6 mm. to 1.0 mm. were prefoamed by heating for 30 minutes at 190° C. to form a loose material with a bulk density of 140 kg./m.³.

By heating this material for 30 minutes at an oven at 240° C. in a pressure-resistant mold, a foamed body having a foam density of 132 kg./m.³ is obtained.

EXAMPLE 14

By heating a mixture of 100 parts by weight of methacrylic acid, 26.1 parts of formamide, 0.05 part of tertiary butyl perpivalate, and 0.05 part benzoyl peroxide at 45° C. for 16 hours, a solid polymer is obtained which is tempered for 3 hours at 100° C. By heating at 200° C., this is converted to a loose foam having a density of 10–15 kg./m.³.

EXAMPLE 15

A foam body prepared by polymerizing a mixture of 40 parts by weight of methacrylonitrile, 60 parts of methacrylic acid, 5 parts of urea, 5 parts of polyvinyl butyral, 0.1 part of tertiary butyl perpivalate, and 0.05 part of benzoyl peroxide for 16 hours at 45° C., tempering for 3 hours at 100° C., and foaming at 210° C. for 1 hour, was kept in boiling water together with a foam sample prepared according to example 3 of this application. The change in volume of the samples is given in table VI.

TABLE VI

| Storage time in water at 100° C. | Volume change | |
|---|---|---|
| | Material of Example 3 | Prior art material |
| 1 hour | 0.5 percent swelling | 25 percent shrinkage |
| 1 day | 5 percent shrinkage | 61 percent shrinkage. |

EXAMPLE 16

A mixture comprising 30 parts by weight of methacrylonitrile, 70 parts by weight of methacrylic acid, 12 parts of weight of maleic acid anhydride, and 8.2 parts by weight of formamide was made into polymer sheet by adding 0.1 part by weight of tertiary butyl perpivalate and 0.05 part by weight of benzoyl peroxide and then warming for 19 hours at 48° C. and tempering for 3 hours at 100° C. This polymer was converted by heating at 200° C. for 2 hours to a slightly yellow foam of low density.

What is claimed is:

1. A foamable synthetic resin composition consisting essentially of (1) a polymer comprising at least 20 percent by weight of acrylic acid, methacrylic acid, or a combination of these acids and (2) a foaming agent selected from the group consisting of formamide and monoalkyl formamides.

2. A composition as in claim 1 wherein said polymer additionally comprises at least one member selected from the group consisting of acrylamide, acrylonitrile, methacrylamide, methacrylonitrile, and acrylic acid esters and methacrylic acid esters of alkanols having up to three carbon atoms.

3. A composition as in claim 1 wherein the amount of foaming agent is such that the number of moles of nitrogen therein, taken together with the number of moles of nitrogen present in amide groups and nitrile groups which may be present in said polymer, is at least one-half the number of moles of acrylic acid, methacrylic acid, acrylamide, methacrylamide, acrylonitrile, methacrylonitrile, and acrylic acid esters and methacrylic acid esters of alkanols having up to three carbon atoms which may be present in said polymer, but at least 1–2 percent by weight of said polymer.

4. A moisture-resistant foamed structure prepared by heating the foamable composition of claim 1 at a temperature from 170° C. to 300° C.

5. The method of making a foamable synthetic resin composition which comprises polymerizing a monomer composition comprising at least 20 percent by weight of acrylic acid, methacrylic acid, or a combination of these acids, in the presence of a free-radical polymerization initiator and a foaming agent selected from the group consisting of formamide and monoalkyl formamides.

6. The method of making a foamable synthetic resin composition which comprises introducing a foaming agent selected from the group consisting of formamide and monoalkyl formamides into a ground polymer comprising at least 20 percent by weight of acrylic acid, methacrylic acid, or a combination of these acids.

7. The method as in claim 6 wherein said foaming agent is introduced as a vapor into said polymer.

8. The method as in claim 6 wherein said foaming agent is introduced into said polymer as a solution in a nonsolvent for said polymer.

9. The method of making a moisture-resistant foamed structure which comprises heating, to a temperature from 150° C. to 300° C., a foamable synthetic resin composition consisting essentially of (1) a polymer comprising at least 20 percent by weight of acrylic acid, methacrylic acid, or a combination of these acids and (2) a foaming agent selected from the group consisting of formamide and monoalkyl formamides.

10. The method as in claim 9 wherein said foamable composition is first prefoamed by heating at a temperature from 150° C. to 200° C. until its bulk density is about one to three times the density desired in the foamed structure, and then is finally foamed by heating at a temperature from 180° C. to 300° C.

* * * * *

UNITED STATES PATENT OFFICE
CERTIFICATE OF CORRECTION

Patent No. 3,627,711     Dated December 14, 1971

Inventor(s) Schroeder, Gaenzler and Bitsch

It is certified that error appears in the above-identified patent and that said Letters Patent are hereby corrected as shown below:

In the Heading:

Next to "Assignee" delete --& Haas-- so that the complete name of the assignee will read --Rohm G.m.b.H.--.

Signed and sealed this 17th day of October 1972.

(SEAL)
Attest:

EDWARD M. FLETCHER, JR.
Attesting Officer

ROBERT GOTTSCHALK
Commissioner of Patents